US 7,315,644 B2

(12) United States Patent
Macy et al.

(10) Patent No.: US 7,315,644 B2
(45) Date of Patent: *Jan. 1, 2008

(54) INVESTIGATION OF DESTROYED ASSEMBLIES AND IDENTIFICATION OF COMPONENTS THEREOF

(75) Inventors: William D. Macy, St. Peters, MO (US); Robert B. Luecking, Titusville, FL (US); Ronald P. Marsden, Lehi, UT (US)

(73) Assignee: The Boeing Company, Chicago, IL (US)

( * ) Notice: Subject to any disclaimer, the term of this patent is extended or adjusted under 35 U.S.C. 154(b) by 917 days.

This patent is subject to a terminal disclaimer.

(21) Appl. No.: 10/631,151

(22) Filed: Jul. 31, 2003

(65) Prior Publication Data

US 2005/0025354 A1 Feb. 3, 2005

(51) Int. Cl.
*G06K 9/00* (2006.01)
(52) U.S. Cl. ............... 382/154; 356/601; 382/141; 382/203
(58) Field of Classification Search ........... 356/602, 356/601; 382/154, 141, 156, 203
See application file for complete search history.

(56) References Cited

U.S. PATENT DOCUMENTS

| 4,575,805 | A | * | 3/1986 | Moermann et al. ......... 700/163 |
| 5,127,037 | A | * | 6/1992 | Bynum ..................... 378/4 |
| 5,377,011 | A | * | 12/1994 | Koch ....................... 356/602 |
| 6,112,109 | A | * | 8/2000 | D'Urso ..................... 600/407 |
| 2005/0025354 | A1* | | 2/2005 | Macy et al. ................ 382/154 |
| 2005/0157919 | A1* | | 7/2005 | Di Santo et al. ........... 382/141 |
| 2006/0180647 | A1* | | 8/2006 | Hansen ..................... 235/375 |

OTHER PUBLICATIONS

ISASI Forum Code of Conduct (Air Safety Through Investigation), Jan.-Mar. 2004, 32 pages.

* cited by examiner

*Primary Examiner*—Gregory M Desire
(74) *Attorney, Agent, or Firm*—Harness, Dickey & Pierce, P.L.C.

(57) ABSTRACT

A method is disclosed for providing a means for identifying recovered component parts of a destroyed assembly quickly and relatively easily using digital or electronic scanning techniques and comparison to virtual components that are presumed to have constituted the original assembly. The method also provides a means for digitally rigging the component parts in three-dimensional virtual space, thereby minimizing and, in some situations, possibly eliminating any need to physical rig the component parts.

19 Claims, 1 Drawing Sheet

INVESTIGATION OF DESTROYED ASSEMBLIES AND IDENTIFICATION OF COMPONENTS THEREOF

The present invention was made with government support under contract number 197048 3303 awarded by the National Aeronautics and Space Administration. Accordingly, the United States Government has certain rights in the present invention.

BACKGROUND OF THE INVENTION

This invention pertains to methods of investigating accidents or intentional acts leading to the destruction of assemblies. In particular, this invention pertains to the identification of components that previously formed part of an assembled object and to a method of investigating the cause of the destruction of the assembly.

In situations such as an investigation of the cause of an aircraft crash, a detailed reconstruction of the events leading up to the destruction of the aircraft is often conducted. In addition to recorded data and witness knowledge, the recovered components of the aircraft are often useful in identifying the cause of the crash and, in the cases where no recorded data and witness knowledge is available, scrutiny of such components may be the only means of conducting an investigation.

The analysis of the components of a destroyed assembly, such as an aircraft, typically begins by locating and collected recoverable components. In some situations, aircraft crashes in particular, locating the components can be a difficult task due to the fact that such components are often spread out over a very large area. For example, following the destruction of the Space Shuttle Columbia, more than 8,000 separate components of the shuttle were located scattered over hundreds of square miles. As a result of the difficulties associated with locating such components, invariably many components are never located.

For those components located, the next step in an investigation often is to identify each particular component so as to be able to associate the component with a portion of the assembly, as the component was associate therewith prior to the assembly's destruction, and with the remainder of the located components. Typically this involves visual inspection of each component by persons highly familiar with various components of the original assembly who, by such inspection, can identify at least some of the components. In other situations, drawings of the components of the assembly that were created prior to the assembly's destruction are used to aid those attempting to identify the located components. In yet other situations, comparisons are made to physical components of similar undestroyed assemblies. Thus, the task of identifying the located components can, in itself, be tedious and time consuming.

The next step in an investigation typically comprises physically rigging the located components onto a structure in an effort to reconstruct the assembly, at least to the extent possible. When rigging the components, the components are positioned relative to each other in manner emulating their respective original relative positions prior to the destruction of the assembly. The reconstructed portion of the assembly provides investigators with valuable information by allowing them to visualize the various components, and thereby speculate on the possible cause of the assembly's destruction. However, the rigging of the components can be difficult and expensive due to the fact that unique structure is often required to support the components in their relative positions. In some cases, the cost of the structure supporting the rigging, alone, can be extensive. Moreover, rigging often limits the mobility of the components, thereby possibly making it difficult for investigators to obtain desired information from the components. Furthermore, rigging also generally requires a dedicated facility, which can be costly and may reduce or limit the ability of investigators to obtain access to beneficial data. Yet further, the rigging of a component may require physical modification to the component, and may thereby potentially compromise the evidentiary data provided by the component.

In view of the foregoing, it should be appreciated that the reconstruction of a destroyed assembly can be a valuable tool in the investigation of the cause of destruction of such assembly. However, it should also be appreciated that, while advantageous and worthwhile, such reconstruction typically involves numerous steps that are laborious, that require expertise, that consume large periods of time, and that are expensive.

SUMMARY OF THE INVENTION

The present invention eliminates many of the disadvantages associated with investigations of destroyed assemblies by eliminating the need to perform many of the steps previously required during the reconstruction of such assemblies. Despite the elimination of such steps, the invention nonetheless provides the benefits associated with such prior art reconstructions. In general, the invention provides a means for identifying component parts quickly and relatively easily and provides a means for digitally rigging the component parts in three-dimensional virtual space, thereby minimizing any need to physical rig the component parts. Yet further, the digital or electronic rigging of the reconstructed assembly enhances the ability to investigate the component parts. In fact, at the time this specification was being prepared, various aspects of the invention were being utilized in connection with the investigation of the cause of destruction of the Space Shuttle Columbia and had proven to be superior in some applications while being complementary to investigation methods developed prior to the invention. These and other aspects of the invention are discussed hereafter.

A first embodiment of a method of practicing the invention pertains to a method of analyzing a cause of destruction of an assembly. This method generally comprises obtaining first and second components that formed part of the assembly when the assembly was in the assembled condition, producing an electronic representation of a three-dimensional surface contour of at least part of each of the first and second components, producing an electronic representation of a portion of the assembly in three-dimensional virtual space, and analyzing the cause of destruction of the assembly via the representation of the portion of the assembly. The first and second components have been separated from the assembly and from each other as a result of the assembly being destroyed by the cause of destruction and had an original relative position between each other prior to the assembly being destroyed. The electronic representations of a three-dimensional surface contours of the first and second components are produced by obtaining measurements of each of the first and second components using a surface contour scanning device. The electronic representation of the portion of the assembly incorporates the representations of the three-dimensional surface contours of the first and second components with the surface contours positioned relative to each other in the virtual space in a manner based on the original relative position of the first and second components.

A second embodiment of a method of practicing the invention pertains to a method of identifying a component of a dismantled assembly. Prior to being dismantled, the assembly was in an assembled condition. This method generally comprises obtaining an electronic database of properties of a plurality of components that are presumed to have been part of the assembly when the assembly was in the assembled condition, retrieving a physical component that has been dismantled and separated from the assembly, identifying a property of the physical component by obtaining measurements of the physical component, and correlating the physical component to one of the plurality of components by matching the property of the physical component to one of the properties of the plurality of components of the database. The properties of the plurality of components in the database are based at least in part on geometry that the plurality of components are presumed to have had when the assembly was in the assembled condition. The property of the physical component is identified by obtaining measurements of the physical component and by producing an electronic representation of a three-dimensional surface contour of a portion of the physical component based on the measurements.

While the principal advantages and features of the invention have been described above, a more complete and thorough understanding of the invention may be obtained by referring to the drawing and the detailed description of the preferred embodiment which follow.

DETAILED DESCRIPTION OF THE PREFERRED EMBODIMENT OF THE INVENTION

Figure 1:
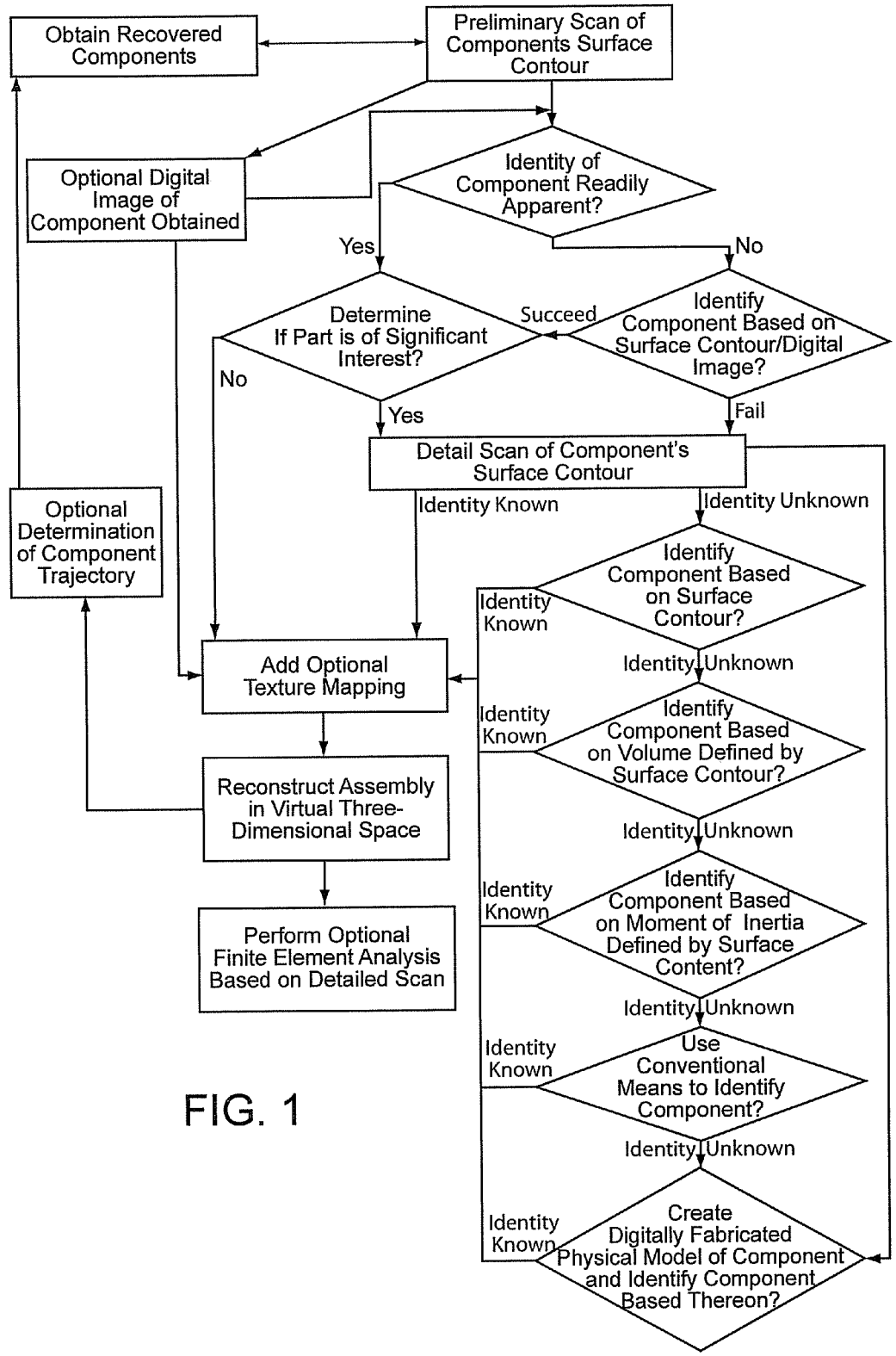
FIG. 1 is flow chart showing steps of the preferred method of practicing the invention.

A flow chart of the preferred method of practicing the invention is shown in FIG. 1 and is particularly adapted for the investigation of a destroyed aircraft. For purposes of describing the preferred method, it should be appreciated that such an aircraft is presumed to have been disassembled into a plurality of component parts as a result of an unknown cause of destruction. Furthermore, at least some of the components of the originally assembled aircraft are presumed to be recoverable.

In general, the preferred method begins by obtaining components of a disassembled assembly. Preferably, these components are transported to a central location from the locations where they were first located after being separated from the assembly. However, because the preferred method of practicing the invention does not necessarily require physical rigging of the components in an effort to partially reconstruct the assembly, relocation of the components is not necessarily required.

After a component has been obtained, an initial scan of the component is performed. The initial scan preferably comprises obtaining measurements of at least a portion of the component's surface contour and creating a digital or electronic representation of at least a portion of the component's surface contour in three-dimensional virtual space. This is preferably done using a photographic three-dimensional scanner and software, a laser three-dimensional scanner, or other three-dimensional scanner commercially available for creating digital three-dimensional representations of objects quickly and without directly contacting the component being scanned. However and alternatively, other scanning methods or devices, such as coordinate measuring machines and even hand measurements, could be used to scan an object in a manner to achieve the ultimate result of producing a digital three-dimensional representation of the component's surface contour.

Optionally or in conjunction with the initial surface scan of the component, a digital image of the component's surface can be obtained. Preferably, the digital images are obtained via a digital camera or color three-dimensional scanner but can also be obtained by converting non-digital images such as film photographs into digital form or using other well known techniques. The digital image can be a planar two-dimensional image, but is preferably a three-dimensional color image that can be texture mapped to the digital three-dimensional representation of the component's surface contour.

At this stage in the preferred method, an attempt to identify the component is made. To this end, the component or a rendering of its represented surface contour is preferably initially visually examined in an effort to determine if the identity of the component is readily apparent. For example, if the component happens to be a severed, but otherwise undamaged, wig tip of a destroyed aircraft, its identity as such would presumably be readily apparent.

If on the other hand, the identity of the component is not readily ascertainable, the representation of the surface contour of the component is preferably electronically compared to representations of surface contours of the components presumed to have together constituted the assembly. For clarity, these later components are herein referred to as the virtual components of the assembly and the scanned component is herein referred to as the physical component. The representations of surface contours of the virtual components are preferably obtained from a preexisting computer aided design (CAD) solid or surface model of the assembly. Alternatively, a CAD model of the assembly in its assembled condition could be created specifically for practicing the invention by scanning the components in a similar assembly that has not been destroyed or by converting two dimensional production drawings of such components into three-dimensional surface or solid CAD models. However, in the case of most modern aircraft, as well as automobiles, pre-existing solid CAD models often exist.

In performing the surface contour comparison, a portion of the represented surface contour of the physical component is preferably selected for the comparison. Preferably, the portion selected is presumed to be unique to the physical component and to be in an undeformed condition. The portion could be merely a two-dimensional surface contour curve extrapolated from the three-dimensional represented surface contour of the physical component. The comparison is preferably carried out via an automated computer routine to minimize human labor requirements but could also be performed manually using CAD software. When and if a match between the portion of the surface contour of the physical component and the represented surface of one of the virtual components occurs, the component is correlated to the particular virtual component.

Alternatively or in conjunction with the comparison of the represented surface contour of the physical component with the surface contours of the virtual components presumed to have together constituted the assembly, any fracture edge of the physical component that is included in the represented surface contour of the physical component can be compared to other represented fracture edges of other represented physical components in an effort to identify matches of corresponding fracture edges. Thus, it should be appreciated that the represented fracture edges can be compared to each other to identify the correlation of between a physical component and one or more of the virtual components indirectly.

As yet another alternative, markings and color patterns obtained from the digital images taken of the physical components can be compared to each other, preferably in an electronically automated manner, in an effort to correlated any particular representation of a physical component with that of another. This is particularly useful in situations where the digital images include markings such as those created by exposure to plasma flow or relatively unique abrasion marks.

If the surface contour and/or digital image comparisons were unsuccessful, a detailed scan of the physical component is then preferably performed. The detailed scan is preferably performed using the same technique as was used in performing the initial scan. However, the detail scan involves a complete surface scan of the entire surface contour of the physical component so as to create a detailed digital representation of the entire surface contour of the physical component. From this detailed digital representation, it should be appreciated that the volume of the physical component and other information such as the principle moment of inertias of the physical component can be readily determined using CAD software or other particularly adapted computer software.

At this stage in the preferred method, the surface contour comparison discussed above can be repeated using the detailed digital representation of the surface contour the physical component in place of the initial digital representation. It should be appreciated that a surface comparison using the detailed representation of the surface contour of a physical component may be able to correlate the physical component with a virtual component, despite the failure of such comparison using the initial surface scan.

If, at this stage, a correlation has not been achieved, the volume of the physical component obtained from its detailed representation is compared to the volume properties of the virtual components in the database in an effort to identify the component. It should be appreciated that the surface representations of the virtual components allows the volume of each virtual component and other information such as the principle moment of inertias of each virtual component to be determinable. As was the case with the surface comparison, the volume comparison is preferably carried out via an automated computer routine to minimize human labor requirements but could also be performed manually using CAD software. Likewise, when and if a match between the volume of the physical component and the volume of one of the virtual components occurs, the component is correlated to the particular virtual component.

If the volume comparison is unsuccessful, a comparison of the principle moment of inertia of the physical component, as determined from the digital representation of physical component, to the principle moment of inertias of the virtual components can then be performed. Once again, the moment of inertia comparison is preferably carried out via an automated computer routine to minimize human labor requirements but could also be performed manually using CAD software. It should be appreciated that the moment of inertia of a component, assuming the component is not severed of deformed, acts as a unique fingerprint of the particular component for comparison purposes. Thus, in situations involving many similar but unique components existing in essentially their original shape, such as with the heat shield tiles from the Space Shuttle Columbia, matching by moment of inertia comparison can be highly successful. This being said, when and if a match between the moment of inertia of the physical component and the moment of inertia of one of the virtual components occurs, the component is correlated to the particular virtual component.

Aside from the volume and inertia properties of the components obtained from the detailed surface scans, such surface scans can be utilized to fabricate detailed physical models of the components using digital fabrication techniques such as stereo lithography, selective laser sintering, and fused deposition modeling. Such physical models of the components are beneficial in several ways. First, producing a physical model of a component allows investigators to hold or touch a tangible model of the component and to possibly identify the component based thereon. It should be appreciated that physical handling of the actual physical components may be difficult or dangerous, as is the case with many of the Space Shuttle Columbia components which emit dangerous levels of radioactivity. Additionally, the digitally fabricated models can be produced at locations that are convenient to the investigators, thereby eliminating the need to transport the actual physical components or the investigators themselves. Yet further, the digitally fabricated models of the components generally weigh much less than that the actual physical components and are thereby easier to manipulate during the investigation process. Finally, the digitally fabricated models of the components may be utilized in a physical rigging of the assembly, or a physical model of the assembly, as is discussed later in this description.

For those physical components that have been successfully identified, the original positions of the physical components relative to each other, i.e., prior to the destruction of the assembly, are ascertained. This is done via the database or CAD model of the virtual components which inherently contains information indicative of the positions of the virtual components relative to each other. Thus, the original relative position between any two physical components is assumed to be the relative position between the two virtual components that correlate respectively to the physical components.

The preferred method further comprises creating a virtual rigging or virtual reassembly of at least a portion of the assembly. This is done by positioning each of the representations of the surface contours of the physical components in virtual three-dimensional space based on their respective original relative positions. For those physical components that have only been initially scanned, a detailed scan of the component can be performed if it is determined that greater detail of the component in the virtual rigging is warranted.

As an option, texture-mapping can be added to the virtual rigging. This can be done for some or all of the components, as desired. For any component, the texture-mapping is performed by obtaining digital images of the visual appearance of some or all of the actual surface contour of the physical component, as discussed above. Once the desire digital images are obtained, they are texture-mapped to the digitally represented surface contour of the physical component using conventional texture-mapping techniques.

Just as conventional physical rigging of physical components allows investigators to visualize the various components of a destroyed assembly in an organized manner, so too does the virtual rigging. Moreover, with texture-mapping included in the virtual rigging, investigators are able to analyze the texture-mapped surface to identify such things as material degradation and gas/plasma flow residue on various components. Thus, the virtual rigging provides all of the advantages of a physical rigging without requiring an investigator to visit a specific site or view a specific component and without requiring expensive rigging structure and the many man hours of labor associated therewith.

Beyond the advantages described above, the preferred method also provides other advantages. For example, if desired, finite element analysis can be performed on desired components in an effort to determine the forces that caused their deformation or for other reasons. This can be done simply by using the digital representation of the surface contour of the physical component and creating a finite element model directly therefrom using conventional finite element modeling software.

Yet another advantage includes the ability to estimate aerodynamic properties of any of the physical components using computational fluid dynamics or other well known methods based on the represented surface contours of the components. Using these aerodynamic properties in combination with other known data, such as the presumed location of a component when it came to rest after being separated from the assembly (typically presumed to be the location where or component was recovered or where an impact is evident), allows investigators to estimate the trajectory of the component between the time it presumably separated from the assembly and the time at which it presumably came to rest. Alternatively, these aerodynamic properties allow investigators to estimate the time and location that a component presumably separated from the assembly or from some other portion of the assembly that had already separated from the main assembly.

The trajectory estimates are useful not only to the investigation of the obtained components, but also can be utilized to estimate the trajectory of components that have not been located. It should be appreciated that aerodynamic properties of unfound components can be calculated using the surface contour data of the virtual components that presumably correlate to the unfound components. Thus, based on assumptions gleaned from the estimated trajectories of components positioned adjacent to the unfound components prior to the destruction of the assembly, the trajectory of the unfound components can be estimated. This allows investigators to focus their search for unfound components to specific areas estimated to be the rest locations of such unfound components. Thus, the trajectory estimates can increase the number of components ultimately recovered from destroyed assembly as well as provide insight into the cause of the destruction of the assembly.

It is important to appreciate that the physical components recovered from the destroyed assembly are often combinations of two or more portions of correlating virtual components and are often deformed from their original geometry. Thus, it should be appreciated that when practicing the preferred method of the invention, investigators preferably attempt to identify specific portions of the physical components that would likely correlate to just one of the virtual components in the database. The surface contour of the specific portions of the physical components are then preferably digitally represented independent of each other during the surface contour comparison. Additionally, the physical component can alternatively be disassembled into a plurality of physical components that are each believed to correlate directly to a single one of the virtual components. Moreover, various steps can be performed to increase the probability of correlating obviously deformed or not fully intact physical components to the virtual components. Such steps include altering the represented virtual surface contour obtained from an obviously deformed physical component in a manner such that the represented surface contour reflects the presumed original or undeformed surface contour of the physical component. This is most beneficial in performing the moment of inertia comparison since the overall geometry of a component, and not just its volume, has a direct impact on the comparison. Similarly, if the geometry of a missing portion of a physical component can be estimated from the portion of the component that is intact, the estimated missing portion can be added to the digital representation of the component's surface contour. This is beneficial to both the volume and the moment of inertia comparisons.

The information used to produce the virtual rigging can also be utilized to provide individual part visualization and/or to produce computerized visual animations. Such visualization can include the details of the texture mapping discussed above and, in the case of the animations, may utilize the trajectory estimates. Furthermore, these visualizations can facilitate the investigation of the assembly or can facilitate the communication of the results and conclusions gleamed from the investigation.

As discussed earlier, the surface scans obtained from the physical components can be used to digitally produce physical models of the components. These physical models of the components can be utilized to produce a physical rigging of the assembly for further investigation purposes. Such a physical rigging could include a combination of actual physical components and physical models of components, or could be entirely made up of modeled components. Due to the fact that modeled components are generally lighter in weight than are the actual physical components they represent, the structure required for supporting the rigging can be simplified compared to the structure that would be required to support the actual physical components. Additionally, rigging mounts can be added to the virtual representations of the components and can thereby be automatically created as integral portions of the modeled components during the digital fabrication process.

The physical rigging of the modeled components provides many of the advantages attributable to conventional rigging of the actual components, while also providing other advantages thereover. For example, rigging of the modeled components eliminates the need to modify or alter the actual physical components from their original recovered condition, as is often required when mounting actual physical components to a rigging. Additionally, investigators analyzing the physical rigging of the modeled components are not exposed to hazardous material, as would be the case if hazardous actual components are rigged. Furthermore, the modeled components can be scaled in size relative to the actual components to facilitate the investigation thereof. Yet further, multiple riggings in different locations could be constructed to make such riggings more accessible to investigators.

In view of the forgoing, many advantages of the preferred method of practicing the invention should be appreciated. However, it should be understood that all matter contained in the above description or shown in the accompanying drawing is intended to be interpreted as illustrative and not in a limiting sense and that various modifications and variations to the preferred method may be employed without departing from the scope of the invention defined by the following claims. For example, it should be appreciated that while the preferred method of practicing the invention is specifically adapted to the investigation of destroyed aircraft, the invention is not so limited and that many if not all of the steps and aspects of the preferred method could be utilized to investigate other dismantled objects, such as collapsed or otherwise destroyed land based structures and wrecked land vehicles. Moreover, not all of the steps of the preferred method of practicing the invention need to be performed, nor need to be performed in any particular order, to practice the claimed invention. Thus, other possible variations and modifications of the preferred method should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, to the extent the term "portion" is used in the claims or is added by amendment, such term should be construed as meaning some or all of the item or element that it qualifies.

What is claimed is:

1. A method of analyzing a cause of destruction of an assembly, the assembly having an assembled condition at a point in time prior to being destroyed, the method comprising:

obtaining first and second components that formed part of the assembly when the assembly was in the assembled condition and that have been separated from the assembly and each other as a result of the assembly being destroyed by the cause of destruction, the first and second components having an original relative position prior to the assembly being destroyed, the original relative position being that which the first and second components shared relative to each other when the assembly was in the assembled condition;

producing an electronic representation of a three-dimensional surface contour of at least part of each of the first and second components by obtaining measurements of each of the first and second components using a surface contour scanning device;

producing an electronic representation of a portion of the assembly in three-dimensional virtual space, the representation of the portion of the assembly incorporating the representations of the three-dimensional surface contours of the first and second components with the surface contours positioned relative to each other in the virtual space in a manner based on the original relative position of the first and second components; and analyzing the cause of destruction of the assembly via the representation of the portion of the assembly.

2. A method in accordance with claim 1 further comprising:

obtaining an electronic database of properties of a plurality of components that are presumed to have been part of the assembly when the assembly was in the assembled condition, the properties being based on geometry that the plurality of components are presumed to have had when the assembly was in the assembled condition, the database also containing information sufficient to determine presumed relative positions between each of the plurality of components, the presumed relative positions being that which the plurality of components shared when the assembly was in the assembled condition;

correlating the first component with a first one of the plurality of components via a comparison of a property of the first component with the properties of the plurality of components, the property of the first component being based on the electronic representation of the three-dimensional surface contour of the first component;

correlating the second component with a second one of the plurality of components via a comparison of a property of the second component with the properties of the plurality of components, the property of the second component being based on the electronic representation of the three-dimensional surface contour of the second component; and determining the original relative position of the first and second components by assuming the original relative position is the presumed relative position between the first one and the second one of the components contained in the database.

3. A method in accordance with claim 2 wherein the properties of the plurality of components of the database include three-dimensional surface contour properties of the plurality of components, and wherein the property of the first component is the electronic representation of the three-dimensional surface contour of the first component and the property of the second component is the electronic representation of the three-dimensional surface contour of the second component.

4. A method in accordance with claim 2 wherein the properties of the plurality of components of the database include volume properties of the plurality of components, and wherein the property of the first component is a volume of the first component that is based on the electronic representation of the three-dimensional surface contour of the first component and the property of the second component is a volume of the second component that is based on the electronic representation of the three-dimensional surface contour of the second component.

5. A method in accordance with claim 2 wherein the properties of the plurality of components of the database include moment of inertia properties of the plurality of components, and wherein the property of the first component is a moment of inertia of the first component based on the electronic representation of the three-dimensional surface contour of the first component and the property of the second component is a moment of inertia of the second component that is based on the electronic representation of the three dimensional surface contour of the second component.

6. A method in accordance with claim 2 wherein the properties of the plurality of components of the database include three-dimensional surface contour properties and moment of inertia properties of the plurality of components, and wherein the property of the first component is the electronic representation of the three-dimensional surface contour of the first component and the property of the second component is a moment of inertia of the second component based on the electronic representation of the three-dimensional surface contour of the second component.

7. A method in accordance with claim 1 further comprising:

identifying a rest location where the first component was believed to have come to rest after having been separated from the assembly as a result of the assembly being destroyed by the cause of destruction;

identifying a separation location where the first component was believed to have been separated from the assembly as a result of the assembly being destroyed by the cause of destruction; and determining a trajectory of the first component presumed to be a path traveled by the first component from the separation location to the rest location, the trajectory being dependant on drag properties of the first component determined via the representation of the three-dimensional surface contour of the first component.

8. A method in accordance with claim 7 further comprising:

estimating a rest position of a third component, the third component being believed to have formed part of the assembly when the assembly was in the assembled condition and believed to have been separated from the assembly as a result of the assembly being destroyed by the cause of destruction, the estimating of the rest position of the third component being dependent on the trajectory of the first component.

9. A method in accordance with claim 1 further comprising:

performing finite element analysis based on the representation of the three-dimensional surface contour of the first component and obtaining results therefrom, the step of analyzing the cause of destruction of the assembly comprising analysis of the results obtained from the finite element analysis.

10. A method in accordance with claim 1 further comprising:

obtaining at least one photographic image of a visual appearance of the surface contour of the first component; and texture mapping the photographic image onto the representation of the three-dimensional surface contour of the first component, the step of analyzing the cause of destruction of the assembly comprising visual analysis of the representation of the three-dimensional surface contour of the first component with the texture mapping shown thereon.

11. A method in accordance with claim 1 wherein the electronic representation of the three-dimensional surface contour of at least part of each of the first and second components includes an electronic representation of a three dimensional fracture surface of the respective component, and wherein the method further comprises identifying one of the first and second components by matching the electronic representations of the three-dimensional fracture surfaces to each other.

12. A method in accordance with claim 1 further comprising the step of fabricating physical models of the first and second components using a digital fabrication technique based upon the electronic representation of the three-dimensional surface contour of each of the first and second components.

13. A method in accordance with claim 12 further comprising physically rigging the physical models of the first and second components based on the original relative position of the first and second components.

14. A method of identifying a component of a dismantled assembly, the assembly having an assembled condition at a point in time prior to being dismantled, the method comprising:

obtaining an electronic database of properties of a plurality of components that are presumed to have been part of the assembly when the assembly was in the assembled condition, the properties being properties that are based at least in part on geometry that the plurality of components are presumed to have had when the assembly was in the assembled condition;

retrieving a physical component that has been dismantled and separated from the assembly;

identifying a property of the physical component by obtaining measurements of the physical component and by producing an electronic representation of a three-dimensional surface contour of a portion of the physical component based on the measurements; and correlating the physical component to one of the plurality of components by matching the property of the physical component to one of the properties of the plurality of components of the database.

15. A method in accordance with claim 14 wherein the properties of the plurality of components of the database include an electronic representation of a three-dimensional surface contour definition for a portion of each of the plurality of components, and wherein the property identified in the step of identifying the property of the physical component is the represented surface contour of the physical component, and yet further wherein the step of correlating the physical component to the one of the plurality of components occurs by matching the represented surface contour of the physical component to the represented surface contour definition of the one of the plurality of components.

16. A method in accordance with claim 14 wherein the properties of the plurality of components of the database include a volume for each of the plurality of components, and wherein the property identified in the step of identifying the property of the physical component is a volume of the physical component that is calculated from the represented surface contour of the physical component, and yet further wherein the step of correlating the physical component to the one of the plurality of components occurs by matching the volume of the physical component to the volume of the one of the plurality of components.

17. A method in accordance with claim 14 wherein the properties of the plurality of components of the database include a moment of inertia for each of the plurality of components, and wherein the property identified in the step of identifying the property of the physical component is a moment of inertia of the physical component that is calculated from the represented surface contour of the physical component, and yet further wherein the step of correlating the physical component to the one of the plurality of components occurs by matching the moment of inertia of the physical component to the moment of inertia of the one of the plurality of components.

18. A method in accordance with claim 17 wherein the properties of the plurality of components of the database include an electronic representation of a three-dimensional surface contour definition for a portion of each of the plurality of components, and wherein the method further comprises comparing the represented surface contour of the physical component to each of the represented surface contour definitions of the database in an attempt to correlate the physical component to any one of the plurality of components of the database.

19. A method of analyzing a dismantled assembly, the assembly having an assembled condition at a point in time prior to being dismantled, the method comprising:

identifying a component of the dismantled assembly, the physical component being a first physical component and the one of the plurality of components being a first one of the plurality of components;

retrieving a second physical component that has been dismantled and separated from the assembly;

identifying a property of the second physical component by obtaining measurements of the second physical component and by producing an electronic representation of a three-dimensional surface contour of a portion of the second physical component based on the measurements of the second physical component;

correlating the second physical component to a second one of the plurality of components by matching the property of the second physical component to one of the properties of the plurality of components of the database;

fabricating a physical model of each of the first and second physical components using a digital fabrication technique based upon the represented surface contours of the first and second physical components; and physically rigging the models of the first and second physical components oriented relative to each other in a manner based on a presumed relative orientation that the first and second physical components are believed to have had when the assembly was in the assembled condition.

\* \* \* \* \*